(12) United States Patent
Schirmer et al.

(10) Patent No.: US 8,571,007 B2
(45) Date of Patent: Oct. 29, 2013

(54) SYNCHRONIZATION OF TWO COMMUNICATION NETWORKS OF AN ELECTRONIC DATA-PROCESSING SYSTEM

(75) Inventors: Juergen Schirmer, Heidelberg (DE); Andreas-Juergen Rohatschek, Wernau/Neckar (DE); Harald Weiler, Goeppingen (DE); Clemens Schroff, Kraichtal (DE); Thomas Hogenmueller, Palo Alto, CA (US)

(73) Assignee: Robert Bosch GmbH, Stuttgart (DE)

( * ) Notice: Subject to any disclaimer, the term of this patent is extended or adjusted under 35 U.S.C. 154(b) by 660 days.

(21) Appl. No.: 12/621,269

(22) Filed: Nov. 18, 2009

(65) Prior Publication Data
US 2010/0195671 A1    Aug. 5, 2010

(30) Foreign Application Priority Data
Feb. 3, 2009    (DE) .......................... 10 2009 000 585

(51) Int. Cl.
*H04J 3/06*    (2006.01)
(52) U.S. Cl.
USPC ............ 370/350; 370/216; 370/229; 370/503
(58) Field of Classification Search
USPC ......... 370/216, 229, 230, 235, 236, 324, 345, 370/350, 395.4, 395.62, 458, 503, 509, 512, 370/516
See application file for complete search history.

(56) References Cited

U.S. PATENT DOCUMENTS

| | | | | |
|---|---|---|---|---|
| 4,890,222 A * | 12/1989 | Kirk | ............................. | 713/400 |
| 7,194,054 B2 * | 3/2007 | Sanchez | ........................ | 375/356 |
| 7,594,054 B2 * | 9/2009 | Joos et al. | ..................... | 710/305 |
| 7,979,730 B2 * | 7/2011 | Fuehrer et al. | ................ | 713/400 |
| 2005/0232224 A1 * | 10/2005 | Belschner et al. | ............ | 370/351 |
| 2006/0174041 A1 * | 8/2006 | Satomi et al. | ................... | 710/67 |
| 2008/0195882 A1 * | 8/2008 | Fuehrer et al. | ................ | 713/400 |
| 2010/0049891 A1 * | 2/2010 | Hartwich et al. | ............. | 710/110 |

* cited by examiner

*Primary Examiner* — Kwang B Yao
*Assistant Examiner* — Nguyen Ngo
(74) *Attorney, Agent, or Firm* — Kenyon & Kenyon LLP

(57) ABSTRACT

A method for synchronizing two communication networks of an electronic data-processing system, each of the networks including one or more respective nodes, may include establishing for each of the networks a respective time schedule that establishes at least one respective time slot for a respective synchronization message. The synchronization message time slots are established to coincide. The synchronization message of the first communication network is generated by one of the nodes of the first communication network. The synchronization message of the second communication network is generated as a function of the synchronization message of the first communication network.

4 Claims, 3 Drawing Sheets

SYNCHRONIZATION OF TWO COMMUNICATION NETWORKS OF AN ELECTRONIC DATA-PROCESSING SYSTEM

FIELD OF THE INVENTION

The present invention relates to a method for synchronizing two communication networks, as well as an electronic data-processing system including two communication networks.

BACKGROUND INFORMATION

In the case of an electronic data-processing system provided in a motor vehicle, a plurality of control units are interconnected via one or more communication networks. For instance, the communication networks may have bus-like or star-shaped configurations. The control units are used to perform specific functions, e.g., fuel-injection or steering or braking functions of the motor vehicle.

For example, if two so-called event-driven communication networks are present, it is known to connect these communication networks to each other with the aid of what is commonly referred to as a gateway. The gateway has the task of converting and, if necessary, temporarily storing transmitted data, for instance, after an "interrupt" on the first communication network, in such a way that this data may then be passed on to the second communication network and retransmitted there. This conversion and buffer storage lead to time delays in the transmission of the data from the first communication network to the second communication network.

In the case of what is referred to as a time-driven communication network, a permanently predefined time schedule is provided, which stipulates for each connected control unit, a specific time slot in which this control unit may transmit data over the communication network. Furthermore, the time schedule also predefines at least one time slot in which a synchronization message is contained, with whose aid all control units linked to the communication network may be synchronized in time to each other.

If two time-driven communication networks are present, and the intention is to couple these two communication networks to each other, then it is advantageous to likewise synchronize the two communication networks in time to each other.

SUMMARY OF THE INVENTION

An object of the present invention is to provide a method and/or a data processing system via which to synchronize two communication networks of an electronic data-processing system.

In order to synchronize two communication networks of an electronic data-processing system, example embodiments of the present invention provide that, in each case one or more nodes is/are connected to the two communication networks, each of the two communication networks has a time schedule which establishes at least one time slot for a synchronization message, the time slot for the synchronization message is established by the two time schedules to coincide, on the first communication network the synchronization message is generated by one of the nodes, and on the second communication network the synchronization message is generated as a function of the synchronization message of the first communication network.

Therefore, an example embodiment of the present invention provides that a matching time slot is provided for the synchronization message on the two communication networks. In the case of the first communication network, the synchronization message is written into this time slot by one of the control units. In contrast, in the case of the second communication. network, the corresponding time slot is filled by generating a synchronization message as a function of the synchronization message of the first communication network. In this way, the same synchronization message is present on the first communication network and on the second communication network. Consequently, all control units of the first and second communication networks may be synchronized in time to each other as a function of this synchronization message.

An advantage of example embodiments of the present invention is that the time delay of the synchronization messages on the two communication networks is extremely small. The invention may be implemented, for example, as a computer program on an electronic computing element, which then performs a synchronization of the two communication networks, as described herein.

In an example embodiment of the present invention, the first communication network is connected to the second communication network via a switch. The switch is transferred into its closed state precisely when the time slot is present in which the synchronization message is present on the first communication network. The result is that the synchronization message of the first communication network is transmitted via the switch to the second communication network and retransmitted there. Therefore, the same synchronization message is present on the first communication network and on the second communication network.

In an example embodiment of the present invention, a generator is connected to the second communication network. The synchronization message is generated by the generator precisely when the time slot is present in which the synchronization message is present on the first communication network. The result is that the synchronization message present on the second communication network agrees with the synchronization message present on the first communication network. Therefore, the same synchronization message is again present on the first communication network and on the second communication network.

BRIEF DESCRIPTION OF THE DRAWINGS

The drawings illustrate generally, by way of example, but not by way of limitation, example embodiments of the present invention discussed in detail in the following description,: from which description additional features, applications, and advantages of the present invention will be apparent.

DETAILED DESCRIPTION

Figure 1:
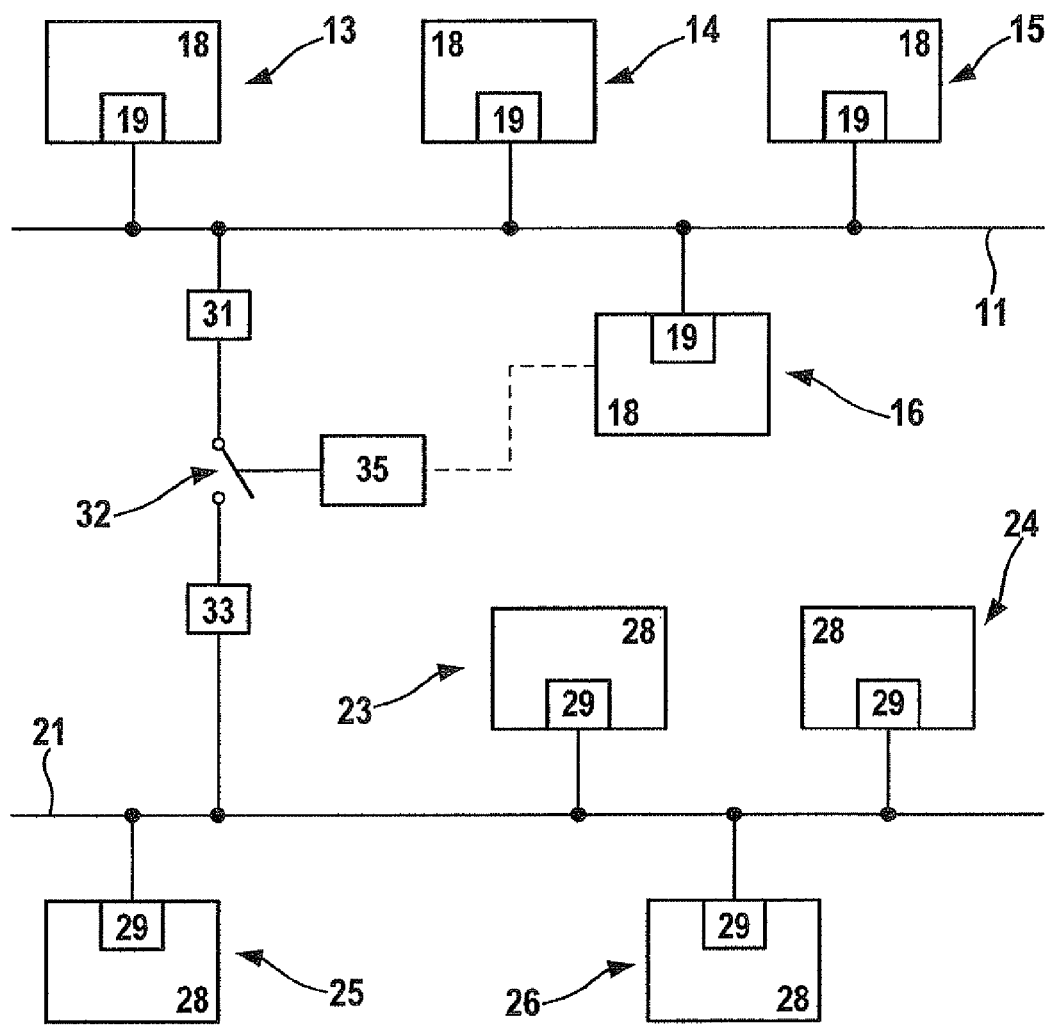
FIG. 1 is a schematic block diagram of a synchronization of two communication networks according to a first example embodiment of the present invention.

FIG. 1 shows a first bus 11 of an electronic data-processing system, which may include any type of time-driven communication network. For example, bus 11 may be realized as what is referred to as a FlexRay bus or what is called a TTCAN (Time Triggered CAN)-bus. Bus 11 is provided to transmit digital data, particularly in a motor vehicle.

By way of example, four nodes 13, 14, 15, 16 are linked to bus 11. For instance, a node may be a component of a control unit, the control unit being able to perform one or more functions, e.g., functions with respect to the injection of fuel into an internal combustion engine, or steering or braking functions of a motor vehicle.

Each of nodes 13, 14, 15, 16 has a communication controller 18 and a bus transceiver 19. Bus transceiver 19 produces the direct connection of the associated node to bus 11 by writing electrical signals, which represent the digital data to be transmitted, onto bus 11. Communication controller 18 implements a predefined time schedule by, inter alia, transferring the digital data to be transmitted, at the correct instant to bus transceiver 19 for transmission.

The transmission time available on the bus is subdivided by the time schedule into successive cycles, each of which contains, inter alia, a plurality of time slots. One message, known as a frame, may be accommodated in each time slot, each message containing, among other things, a quantity of digital data to be transmitted, commonly known as the payload.

The time schedule assigns to each node 13, 14, 15, 16 at least one specific time slot for transmitting and/or receiving digital data in the successive cycles, so that in each cycle, each node 13, 14, 15, 16 is able to write a quantity of digital data onto bus 11, and therefore to transmit over bus 11. Preferably, in each case, a plurality of time slots per cycle are assigned to individual nodes 13, 14, 15, 16.

In order to synchronize nodes 13, 14, 15, 16 in time, the time schedule establishes that at least one of nodes 13, 14, 15, 16 transmits a synchronization message in one specific time slot of the time slots available to it in the successive cycles. Preferably, such synchronization messages are transmitted by several of nodes 13, 14, 15, 16 in the respective time slots available to them. Consequently, one or more synchronization messages are present on bus 11 in each cycle.

The time schedule is known in all nodes 13, 14, 15, 16. Therefore, all nodes 13, 14, 15, 16 "know" in which time slots the synchronization messages are transmitted on bus 11.

In each of nodes 13, 14, 15, 16, the individual time slots of the time schedule are ascertained on the basis of a time base that is a function, for example, of a quartz oscillator. Since the time bases existing for individual nodes 13, 14, 15, 16 may deviate from each other, e.g., of different quartzes, it is possible that the time slot in which a synchronization message is written onto bus 11 by one specific node cannot be ascertained exactly by one of the other nodes, but rather only with a slight deviation.

In an example embodiment of the present invention, since it is only a question of a slight deviation, and since the time schedule always provides for an interval between the messages of two successive time slots in which no data are transmitted, the aforesaid other node is able to read the synchronization message of the specific node in spite of the slight deviation via its bus transceiver 19. The other node is then able to ascertain the aforementioned deviation as a function of the read synchronization message, and compensate for it by correcting its time base. The other node is thus able to synchronize itself to the read synchronization message.

Overall, therefore, in this way all nodes 13, 14, 15, 16 linked to bus 11 are able to synchronize to one another with the aid of the transmitted synchronization messages.

In the data-processing system of FIG. 1, a second bus 21 is provided which is comparable to bus 11 or corresponds to bus 11, and which may therefore be any type of time-driven communication network. For example, bus 21 may be realized as what is referred to as a FlexRay bus or what is called a TTCAN-bus. By way of example, four nodes 23, 24, 25, 26 are linked to bus 21. Nodes 23, 24, 25, 26 are comparable to nodes 13, 14, 15, 16 of bus 11, and may, for instance, be a component of a control unit. Each of nodes 23, 24, 25, 26 of bus 21 has a communication controller 28 and a bus transceiver 29, which again are comparable to communication controller 18 and bus transceiver 19 of bus 11.

Apart from the following differences, the functioning method of nodes 23, 24, 25, 26 may correspond to the functioning method of nodes 13, 14, 15, 16. In particular, in an example embodiment, the definition of cycles and time slots with the aid of a time schedule is provided in the same way in the case of nodes 23, 24, 25, 26 of second bus 21, as in the case of nodes 13, 14, 15, 16 of first bus 11.

Furthermore, the time schedule for second bus 21, at least with regard to the time slots for the synchronization messages, agrees identically with the time schedule for first bus 11. With regard to the other time slots, however, there may be the difference that the time schedules for first and second busses 11, 21 deviate from each other.

In an example embodiment, a further difference is that none of nodes 23, 24, 25, 26 of second bus 21 generates and writes any synchronization messages onto bus 21.

According to FIG. 1, first bus 11 is connected to second bus 21 via a series connection made up of a bus driver 31, a switch 32 and a further bus driver 33. If applicable, one of the two bus drivers 31, 33 or even both bus drivers 31, 33 may also be omitted. Switch 32 is preferably an integrated semiconductor device which permits a high switching rate, accompanied by a negligible signal delay.

Switch 32 may be switched back and forth between its open and closed state by a control 35. Control 35 may be realized with the aid of an electronic computing element, on which a suitable computer program is run by which the functions of control 35 are performed. By way of example, control 35 is connected to communication controller 18 of node 16 of first bus 11, but alternatively, may also be coupled to any other node 13, 14, 15 of first bus 11. It is likewise possible for control 35 to be integrated into corresponding node 13, 14, 15, 16 of bus 11, especially into communication controller 18 there. It is essential that switch 32 be controlled as a function of the time schedule of first bus 11.

As was explained, each of nodes 13, 14, 15, 16 of bus 11 "knows" the predefined time schedule, and therefore also the time slots in which the synchronization messages are transmitted on bus 11. In an example embodiment, at least these last-named time slots are transmitted by node 16 to control 35. Control 35 then transfers switch 32 into its closed state precisely when the time slots are present in which the synchronization messages are present on bus 11. In all other time slots, switch 32 is controlled into its open state.

The result is that the synchronization messages are transmitted from first bus 11 via switch 32 to second bus 21. Otherwise, however, no data are transmitted from first bus 11 to second bus 21.

On the basis of the time schedules—agreeing with respect to the time slots for the synchronization messages—on the two busses 11, 21, the time slots in which the synchronization messages are present on first bus 11 are also provided per se on second bus 21 for the transmission of synchronization messages. However, because of the difference described, that none of nodes 23, 24, 25, 26 of second bus 21 generates and writes any synchronization messages onto bus 21, these time slots on second bus 21 are "as far as that goes, still free." These "as far as that goes still free" time slots may therefore be filled by the synchronization messages which are transmitted from first bus 11 via switch 32 to second bus 21.

The result is that the same synchronization messages are present on first bus 11 and on second bus 21.

Therefore it is possible that, as already explained, not only are nodes 13, 14, 15, 16 of first bus 11 synchronized to each other based on these synchronization messages, but that in the same way, nodes 23, 24, 25, 26 of second bus 21 are also synchronized to each other and to nodes 13, 14, 15, 16 of first bus 11. Thus, all nodes of first and second busses 11, 21 may be synchronized to each other with the aid of the synchronization messages described.

Figure 2:
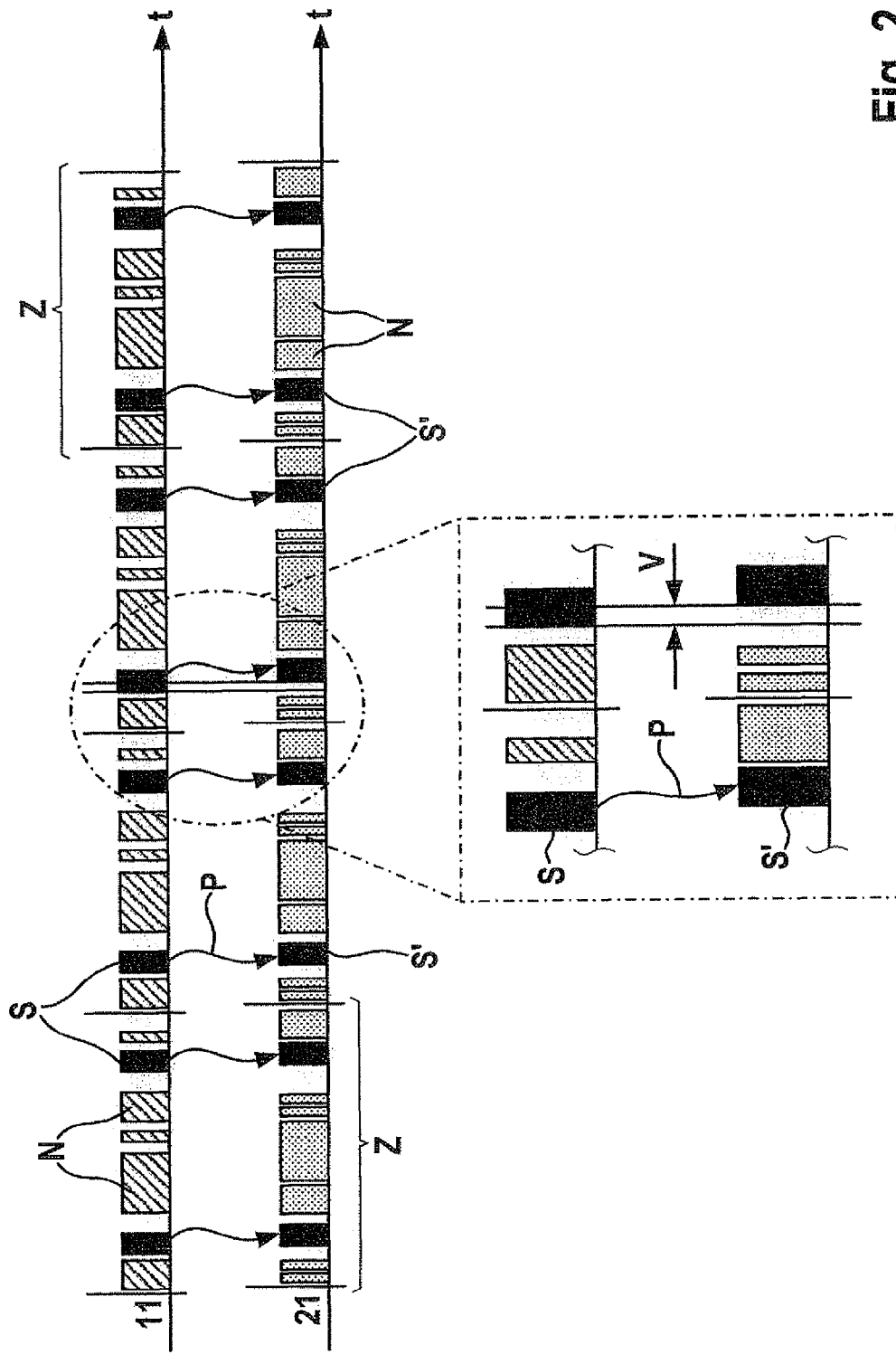
FIG. 2 shows schematic timing diagrams with respect to the aforesaid synchronization of two communication networks, according to an example embodiment of the present invention.

In FIG. 2, the messages transmitted on the two busses 11, 21 of the data-processing system are plotted over time t. The top diagram relates to first bus 11 and the bottom diagram relates to second bus 21. The encircled area of the two diagrams is shown again under them, enlarged.

In the two diagrams, the cycles defined by the time schedules are denoted by reference character Z. The time slots are not shown. Instead, the messages are represented which are transmitted in the individual time slots. These messages are denoted by reference character N. Between the messages are the pauses mentioned, in which no data are transmitted.

The synchronization messages present in the top diagram on first bus 11 are denoted by reference character S. As was explained, these synchronization messages are transferred onto second bus 21. The synchronization messages present in the bottom diagram on second bus 21 are therefore denoted by reference character S'. The transmission direction explained, from first bus 11 via switch 32 to second bus 21, is shown by the direction arrow depicted, which is denoted by reference character P.

As shows up particularly in the enlarged representation, between one of synchronization messages S of first bus 11 and associated synchronization message S' of the second bus, there may be a time delay, which is denoted by reference character V. This time delay V may come about because synchronization messages S require a finite period of time to overcome the transmission length from first bus 11 to second bus 21. Time delay V may possibly be reduced by a suitable design of switch 32 and/or of bus drivers 31, 33.

The exemplary embodiment in FIG. 3 corresponds to a great extent to the exemplary embodiment explained with reference to FIGS. 1 and 2. Corresponding features are therefore denoted in the same manner in FIG. 3 as in FIG. 1. Reference is made to the description of FIGS. 1 and 2 with regard to these corresponding features. In particular, the time schedules of both busses 11, 21 agree identically with respect to the time slots for the synchronization messages in the exemplary embodiment of FIG. 3 as well, and also, no synchronization message is written onto bus 21 by any of nodes 23, 24, 25, 26 of second bus 21 in FIG. 3.

Figure 3:
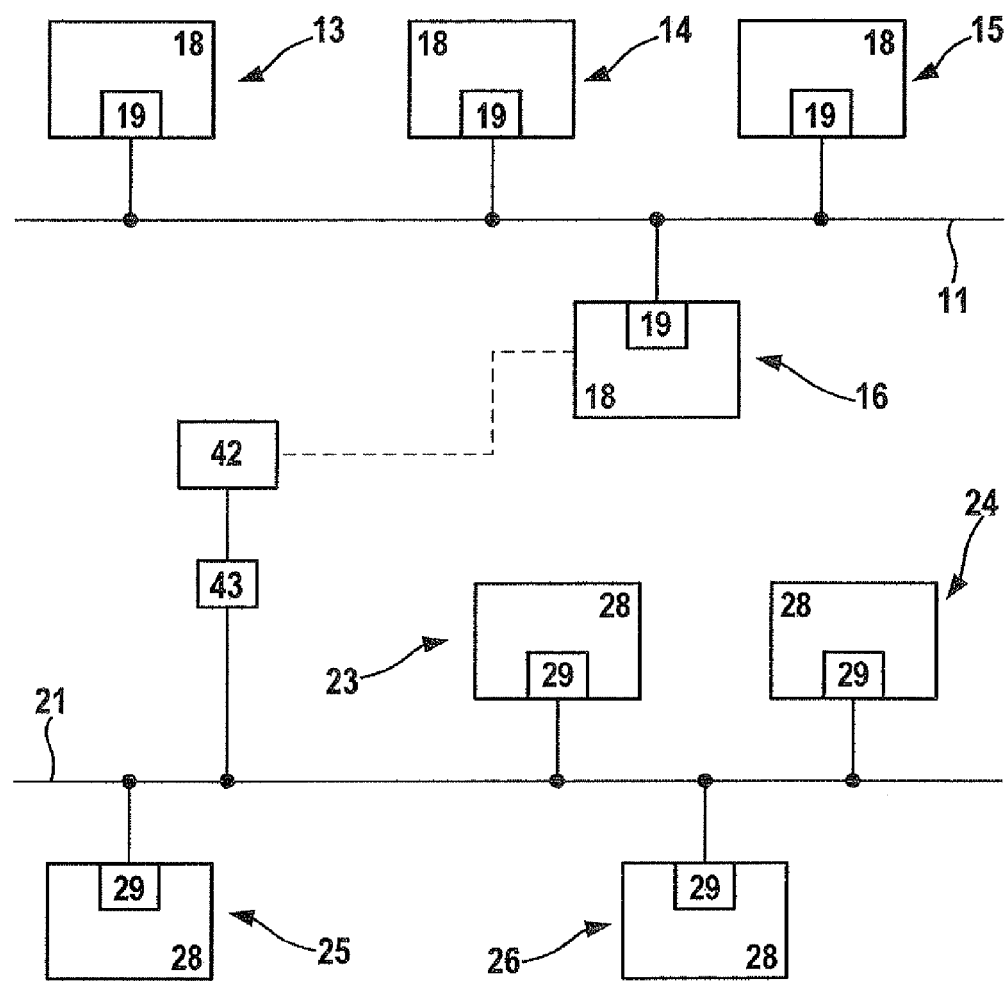
FIG. 3 is a schematic block diagram of a synchronization of two communication networks according to a second example embodiment of the present invention.

However, the series connection in FIG. 1, made up of bus driver 31, switch 32 and bus driver 33, is not present in the exemplary embodiment in FIG. 3. Instead, a generator 42 is provided there, which is linked via a bus driver 43 to second bus 21. Bus driver 43 may also be integrated into generator 42, or may not be present at all. Generator 42 may be realized with the aid of an electronic computing element, on which a suitable computer program is run by which the functions of generator 42 are performed.

By way of example, generator 42 is connected to communication controller 18 of node 16 of first bus 11, but alternatively, may also be coupled to any other node 13, 14, 15 of first bus 11. It is likewise possible for generator 42 to be integrated into corresponding node 13, 14, 15, 16 of bus 11, particularly into communication controller 18 there. It is essential that generator 42 be controlled as a function of the time schedule of first bus 11.

As was explained, each of nodes 13, 14, 15, 16 of bus 11 "knows" the predefined time schedule, and therefore also the time slots in which the synchronization messages are transmitted on first bus 11. At least these last-named time slots are transmitted from node 16 to generator 42. Generator 42 then in each case generates a further synchronization message precisely when the time slots are present in which the synchronization messages are present on bus 11. These further synchronization messages are written by generator 42 onto second bus 21. In all other time slots, no data are generated by generator 42.

The result is that the synchronization messages are present on first bus 11, and the further synchronization messages generated by generator 42 are present on second bus 21.

On the basis of the time schedules—agreeing with respect to the time slots for the synchronization messages—on the two busses 11, 21, the time slots in which the synchronization messages are present on first bus 11 are also provided per se on second bus 21 for the transmission of synchronization messages. Because of the difference mentioned, that none of nodes 23, 24, 25, 26 of second bus 21 generates and writes any synchronization messages onto bus 21, these time slots on second bus 21 are "as far as that goes, still free."

These "as far as that goes still free" time slots may therefore be filled by the further synchronization messages which are generated by generator 42 and written onto second bus 21.

As a result, the same synchronization messages are present on first bus 11 and on second bus 21.

Therefore, it is possible that, as already explained, not only are nodes 13, 14, 15, 16 of first bus 11 synchronized to each other based on these synchronization messages, but that in the same way, nodes 23, 24, 25, 26 of second bus 21 are also synchronized to each other and to nodes 13, 14, 15, 16 of first bus 11. Thus, all nodes of first and second busses 11, 21 may be synchronized to each other with the aid of the synchronization messages described.

In general, the timing diagrams in FIG. 2 hold true for the exemplary embodiment in FIG. 3, as well. Synchronization messages S' of second bus 21 are the further synchronization messages generated by generator 42, and arrows P represent the generation of further synchronization messages S' as a function of synchronization messages S on first bus 11.

Time delay V represented in FIG. 2 may come about in the exemplary embodiment of FIG. 3 because generator 42 requires a finite period of time to generate the further synchronization messages and to write them onto second bus 21. This time delay V may possibly be reduced by a suitable design of generator 42 and/or of bus driver 43.

Supplementary to the exemplary embodiments in FIGS. 1 and 3, it is possible to provide a plurality of switches 32 or generators 42 for synchronizing the two busses 11, 21. These switches 32 and generators 42, respectively, may be controlled by different nodes 13, 14, 15, 16 of the first bus. Thus, a failure of one switch 32 or generator 42 or a failure of one node does not necessarily lead to the failure of the entire electronic data-processing system.

The above description is intended to be illustrative, and not restrictive. Those skilled in the art can appreciate from the foregoing description that the present invention may be implemented in a variety of forms, and that the various embodiments and described features may be implemented alone or in combination, regardless of how they are combined and/or formulated in the above description, drawings, and/or in the following claims. Therefore, while the embodiments of the present invention have been described in connection with particular examples thereof, the true scope of the embodiments and/or methods of the present invention should not be so limited since other modifications will become apparent to the skilled practitioner upon a study of the drawings, specification, and following claims.

What is claimed is:

1. A method for synchronizing two communication networks of an electronic data-processing system, one or more respective nodes being connected to each of the two communication networks, the method comprising:
    establishing for each of the two communication networks a respective time schedule, each of the time schedules defining at least one respective time slot for a respective synchronization message, the respective synchronization message time slots of the two communication networks coinciding;
    on a first of the communication networks, generating, by one of the nodes of the first communication network, the respective synchronization message of the first communication network for a selected synchronization message time slot; and
    on a second of the communication networks, providing the respective synchronization message of the second communication network for the selected synchronization message time slot as a function of the respective synchronization message of the first communication network for the selected synchronization message time slot;
    wherein providing the respective synchronization message of the second communication network for the selected synchronization message time slot includes transferring a switch that connects the first and second communication networks into a closed state when the selected synchronization time slot of the first communication network is present.

2. The method as recited in claim 1, wherein the switch is controlled as a function of the time schedule of the first communication network.

3. An electronic data-processing system, comprising:
    a first communication network including one or more respective nodes, a first time schedule being established for the first communication network and defining at least one respective time slot for a respective synchronization message, the respective synchronization message for a selected synchronization message time slot being generated by one of the nodes of the first communication network;
    a second communication networks including one or more respective nodes, a second time schedule being established for the second communication network and defining at least one respective time slot for a respective synchronization message, the respective synchronization message time slots of the two communication networks coinciding;
    a synchronization device configured for providing the respective synchronization message of the second communication network for the selected synchronization message time slot as a function of the respective synchronization message of the first communication network for the selected synchronization message time slot; and
    a switch that connects the first communication network to the second communication network, wherein the synchronization device is configured to transfer the switch into a closed state to provide the respective synchronization message of the second communication network for the selected synchronization message time slot when the selected synchronization message time slot of the first communication network is present.

4. The data-processing system as recited in claim 3, wherein the synchronization device is configured to control the switch as a function of the time schedule of the first communication network.

* * * * *